(No Model.)

G. W. & J. J. THORNBURGH.
EGG TRAY FOR INCUBATORS.

No. 330,528. Patented Nov. 17, 1885.

WITNESSES
Wm. H. Benton
Geo. E. Frech

G. W. Thornburgh
J. J. Thornburgh
INVENTORS
By Louis Bagger & Co.
Attorneys

United States Patent Office.

GEORGE W. THORNBURGH AND JOHN J. THORNBURGH, OF ALLIANCE, OHIO.

EGG-TRAY FOR INCUBATORS.

SPECIFICATION forming part of Letters Patent No. 330,528, dated November 17, 1885.

Application filed April 1, 1885. Serial No. 160,879. (No model.)

*To all whom it may concern:*

Be it known that we, GEORGE W. THORNBURGH and JOHN J. THORNBURGH, citizens of the United States, and residents of Alliance, in the county of Stark and State of Ohio, have invented certain new and useful Improvements in Egg-Trays for Incubators; and we do hereby declare that the following is a full, clear, and exact description of the invention, which will enable others skilled in the art to which it appertains to make and use the same, reference being had to the accompanying drawings, which form a part of this specification, and in which—

Figure 1:
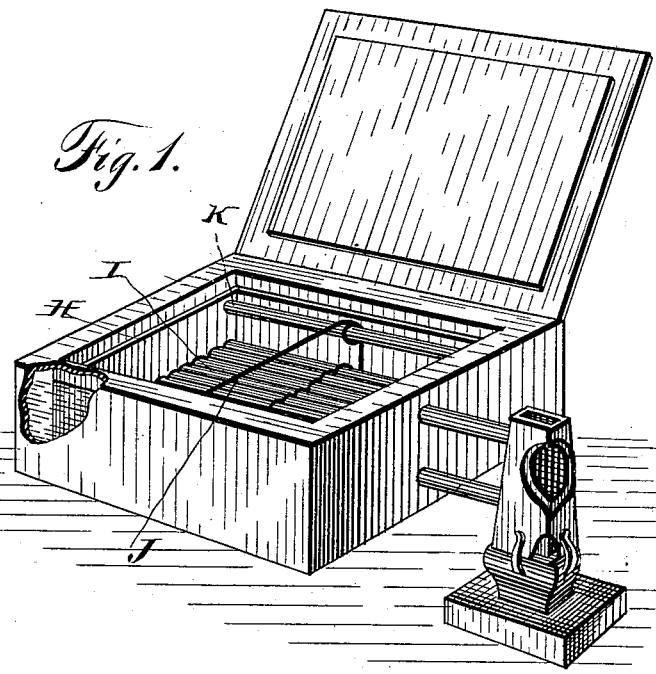
Figure 2:
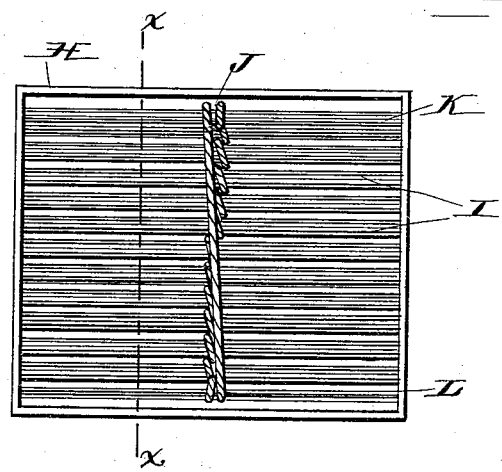
Figure 3:
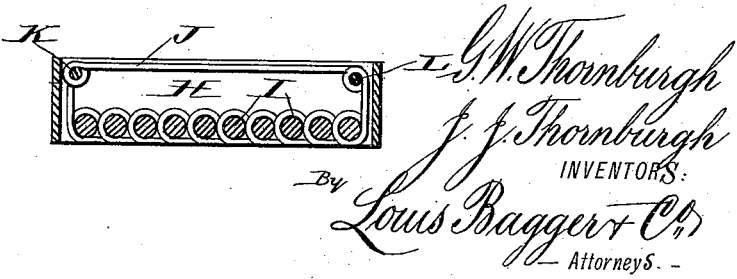

Figure 1 is a perspective view of an incubator with our improved egg-tray therein. Fig. 2 is a plan view of the egg tray or receptacle removed from the incubator, and Fig. 3 is a sectional view of the egg-receptacle, taken on line $xx$ in Fig. 2.

The same letters of reference indicate corresponding parts in all the figures.

Our invention relates to that class of egg-trays for incubators which are provided with means for turning the eggs on the bars or supports on which they rest; and it has for its object the production of an egg-tray of the above described class which shall possess advantages in the points of simplicity of construction and efficiency in operation.

To these ends our invention consists in the improved construction and combination of parts, which will be hereinafter fully described, and particularly pointed out in the claim.

Referring to the several parts by letter, A represents an incubator.

H indicates the egg tray or receptacle, in the lower portion of which are journaled the rollers I, journaled at their ends in the sides of the tray. An endless cord, J, connects all of the rollers, being wound once around each roller, and after passing around the rear roller of the series in the bottom of the tray is brought up and passed once around a roller, K, journaled in the upper rear edges of the egg-receptacle, and is then brought longitudinally across the tray and passed around a roller, L, journaled in the upper forward edges of the tray, as shown, the upper portion of the endless cord passing over the eggs in the receptacle without coming in contact with the same. When the eggs in the receptacle H have rested upon one side sufficiently long, and it is desired to turn them, all that is necessary is to take hold of the upper portion of the endless cord J, which passes above the eggs from the rollers K and L, and draw upon the same, when the rollers I will be turned, thus turning all of the eggs at once by the one movement.

From the foregoing description, taken in connection with the accompanying drawings, the construction and operation of our improved egg tray or receptacle will be readily understood without requiring further explanation. It will be seen that by elevating one portion of the endless operating-cord J in the manner shown and described the eggs can be turned without disturbing their relative positions upon the rollers I in the bottom of the receptacle or tray H, while where the operating-cord passes directly over the upper faces of the said rollers, in close proximity thereto, the eggs rest upon or directly over the entire upper portion of the said cord, rendering it difficult or impossible to turn the eggs without first disturbing their positions in order to reach the said operating-cord, or else making it necessary to employ some other means for turning the egg-supporting rollers than the cord itself. This objection is entirely overcome by the peculiar arrangement of the operating-cord in our improved device.

The entire apparatus is also very simple in its construction, being entirely devoid of all complicated parts which are liable to get out of order.

Having thus described our invention, what we claim, and desire to secure by Letters Patent of the United States, is—

The herein-described egg tray or receptacle for incubators, the same consisting of the rectangular frame having the series of rollers journaled in the lower portion of the sides of said frame, and the two upper rollers arranged as described, and the endless operating-cord encircling the said upper and lower rollers in the manner shown and described, and for the purpose shown and set forth.

In testimony that we claim the foregoing as our own we have hereunto affixed our signatures in presence of two witnesses.

GEORGE W. THORNBURGH.
JOHN J. THORNBURGH.

Witnesses:
DORWIN W. SMITH,
CURTIS L. HARRIS.